(12) United States Patent
Nakamura et al.

(10) Patent No.: US 9,530,992 B2
(45) Date of Patent: Dec. 27, 2016

(54) BATTERY PACK

(71) Applicant: TOYODA GOSEI CO., LTD., Kiyosu-shi, Aichen-ken (JP)

(72) Inventors: Yoshiki Nakamura, Kiyosu (JP); Yoshiaki Tatsumi, Kiyosu (JP); Yoshiaki Kameda, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 64 days.

(21) Appl. No.: 14/554,346

(22) Filed: Nov. 26, 2014

(65) Prior Publication Data

US 2015/0179995 A1    Jun. 25, 2015

(30) Foreign Application Priority Data

Dec. 20, 2013 (JP) .................................. 2013-263875

(51) Int. Cl.
  *H01M 2/02* (2006.01)
  *H01M 2/00* (2006.01)
  *H01M 2/10* (2006.01)
  *H01M 2/20* (2006.01)
  *H01M 10/6561* (2014.01)
  *H01M 10/613* (2014.01)
  *H01M 10/643* (2014.01)

(52) U.S. Cl.
  CPC ......... *H01M 2/1016* (2013.01); *H01M 2/1077* (2013.01); *H01M 2/202* (2013.01); *H01M 2/206* (2013.01); *H01M 10/613* (2015.04); *H01M 10/6561* (2015.04); *H01M 10/643* (2015.04)

(58) Field of Classification Search
  CPC .. H01M 2/1016; H01M 2/206; H01M 2/1077; H01M 10/6561; H01M 10/613; H01M 2/202; H01M 10/643
  See application file for complete search history.

(56) References Cited

U.S. PATENT DOCUMENTS

| | | | |
|---|---|---|---|
| 6,627,345 B1 * | 9/2003 | Zemlok | H01M 2/1055 429/158 |
| 8,859,125 B2 * | 10/2014 | Hwang | H01M 2/1022 429/100 |
| 2014/0154541 A1 * | 6/2014 | Asakura | H01M 2/023 429/82 |

FOREIGN PATENT DOCUMENTS

| | | |
|---|---|---|
| JP | H11-067170 A | 3/1999 |
| JP | 2001-155702 A | 6/2001 |
| JP | 2010-282811 A | 12/2010 |

\* cited by examiner

*Primary Examiner* — Cynthia K Walls
(74) *Attorney, Agent, or Firm* — Posz Law Group, PLC (57) ABSTRACT

A battery pack comprises: a battery holding member provided to have battery holding holes and configured to bind a plurality of batteries; a first bus bar arranged to electrically connect with terminals on the first side of the respective batteries; a second bus bar arranged to electrically connect with terminals on a second side in the axial direction of the respective batteries; a bus bar holding member configured to hold the second bus bar and constitute a wall surface on the second side of the casing; and a sealing sheet member configured to have a plurality of terminal exposing holes formed corresponding to the respective batteries and cause peripheries of the respective terminal exposing holes to come into contact with the end faces of the respective batteries, so as to prevent leakage of a gas from inside of the casing toward the second bus bar. The sealing sheet member has a deformation dividing part provided around at least part of the plurality of terminal exposing holes.

5 Claims, 9 Drawing Sheets

Fig.1

1st EMBODIMENT

BATTERY PACK

CROSS-REFERENCE TO RELATED APPLICATION

The present application claims priority from Japanese application P2013-263875 filed on Dec. 20, 2013, the content of which is hereby incorporated by reference into this application.

BACKGROUND

1. Technical Field

The present invention relates to a battery pack including a plurality of batteries.

2. Description of the Related Art

A general battery pack is configured to have a plurality of cylindrical batteries arrayed such that the respective cylindrical batteries are parallel to one another in the axial direction of the batteries and have connections between electrodes of the respective batteries. In this type of battery pack, for example, as described in JP 2010-282811A, the respective cylindrical batteries are bound on one end side in the axial direction by a plate-like battery holding member having a plurality of battery holding holes. In this type of battery pack, the cooling air is flowed in a radial direction of the respective batteries in the casing, so as to cool down the batteries.

In the prior art described above, one end side in the axial direction of the casing is fastened and sealed by the battery holding member, so that the cooing air is not leaked from this one end side of the casing. The other end side in the axial direction of the casing is, however, not sealed. This may cause a problem that the cooling air is leaked from the other end side of the casing to deteriorate the cooling performance. Other needs over the prior art battery pack include easy manufacture, downsizing and resource saving.

SUMMARY

In order to solve at least part of the problems described above, the present invention may be implemented by any of aspects described below.

(1) According to one aspect of the invention, there is provided a battery pack that has a plurality of batteries contained in a casing. This battery pack may comprise a battery holding member, a first bus bar, a second bus bar, a bus bar holding member and a sealing sheet member. The battery holding member may be provided to have a plurality of battery holding holes and may be configured to bind the respective batteries in such a state that the respective batteries are parallel to one another in an axial direction of the batteries, by insertion of ends on a first side in the axial direction of the respective batteries into the respective battery holding holes. The first bus bar may be provided as a member configured to constitute a wall surface on the first side of the casing and may be arranged to electrically connect with terminals on the first side of the respective batteries. The second bus bar may be arranged to electrically connect with terminals on a second side opposite to the first side. The bus bar holding member may be configured to hold the second bus bar and constitute a wall surface on the second side of the casing. The sealing sheet member may be placed between end faces on the second side of the plurality of batteries and the bus bar holding member. The sealing sheet member may be configured to have a plurality of terminal exposing holes formed corresponding to the respective batteries and cause peripheries of the respective terminal exposing holes to come into contact with the end faces of the respective batteries, so as to prevent or suppress leakage of a gas from inside of the casing toward the second bus bar. The sealing sheet member may have a deformation dividing part provided around at least part of the plurality of terminal exposing holes.

In the battery pack of this aspect, the sealing sheet member seals the second side in the axial direction of the respective batteries, so as to prevent or suppress leakage of a gas from inside of the casing toward the second side. Additionally, in the battery pack of this aspect, when there is a variation in length in the axial direction of the respective batteries, the deformation dividing part works to suppress distortion by compressive deformation between adjacent batteries and thereby further stabilizes the sealing property on the second side. This configuration thus more effectively prevents or suppresses leakage of the gas from inside of the casing toward the second side and has the advantageous effect of the enhanced cooling performance.

(2) In the battery pack of the above aspect, the deformation dividing part may be a cut formed on a surface on the first side of the sealing sheet member. This configuration causes the cut to suppress distortion by compressive deformation between adjacent batteries.

(3) In the battery pack of the above aspect, the cut may be in a polygonal shape. This configuration facilitates manufacture of the battery pack.

(4) In the battery pack of the above aspect, the cut may be in a circular shape. This configuration facilitates manufacture of the battery pack.

(5) In the battery pack of the above aspect, the bus bar holding member may have a projection protruded from a surface on the first side of the bus bar holding member toward a space between the respective batteries. The deformation dividing part may be a breaking part formed as a perforation which remains in a perforated state prior to assembly of the sealing sheet member to the bus bar holding member and is broken during assembly of the sealing sheet member to the bus bar holding member. This configuration facilitates manufacture of the battery pack. Additionally, the configuration of this battery pack separates the adjacent terminal exposing holes from each other by the projection formed on the bas bar holding member and prevents a short circuit between adjacent battery arrays even when water caused by dew condensation on the side surface of the battery is accumulated on the sealing sheet member.

(6) In the battery pack of the above aspect, the casing may have openings configured to flow in and flow out a gas for cooling in a radial direction of the batteries. The battery pack of this aspect prevents or suppresses leakage of the cooling air.

DESCRIPTION OF EMBODIMENTS

A. First Embodiment

A-1. General Configuration of Battery Pack

Figure 1:
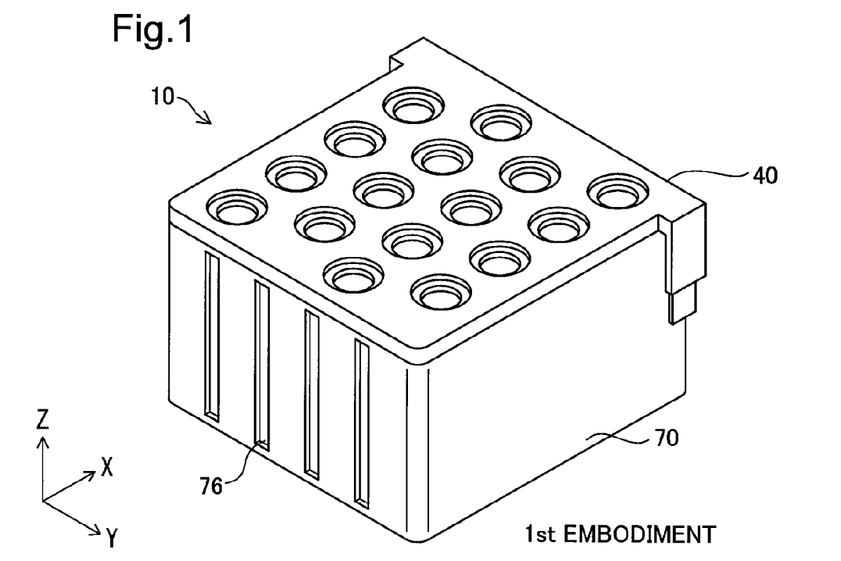
FIG. 1 is a perspective view illustrating the appearance of a battery pack according to a first embodiment of the invention.
Figure 2:
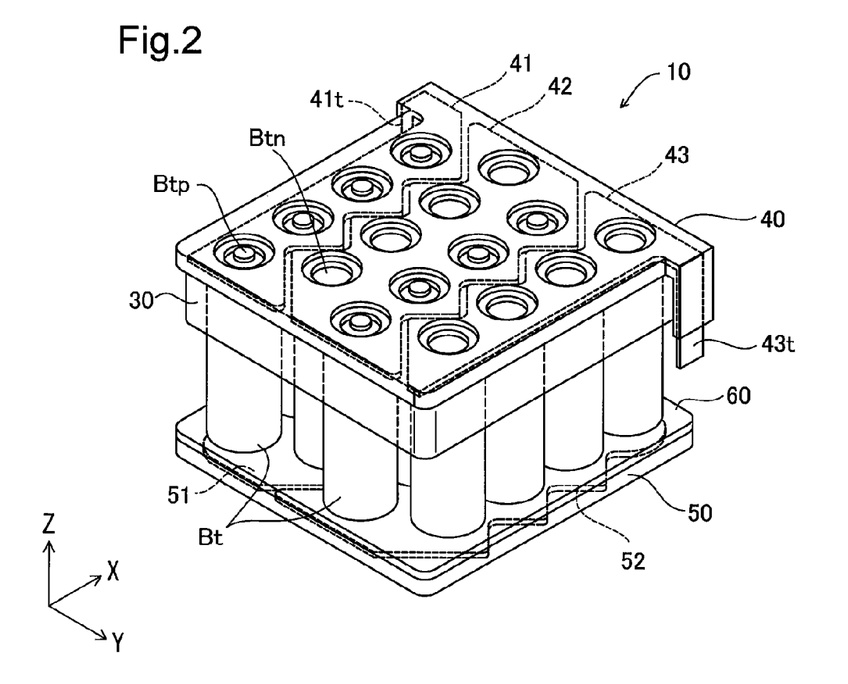
FIG. 2 is a perspective view illustrating a main part of the battery pack.
Figure 3:
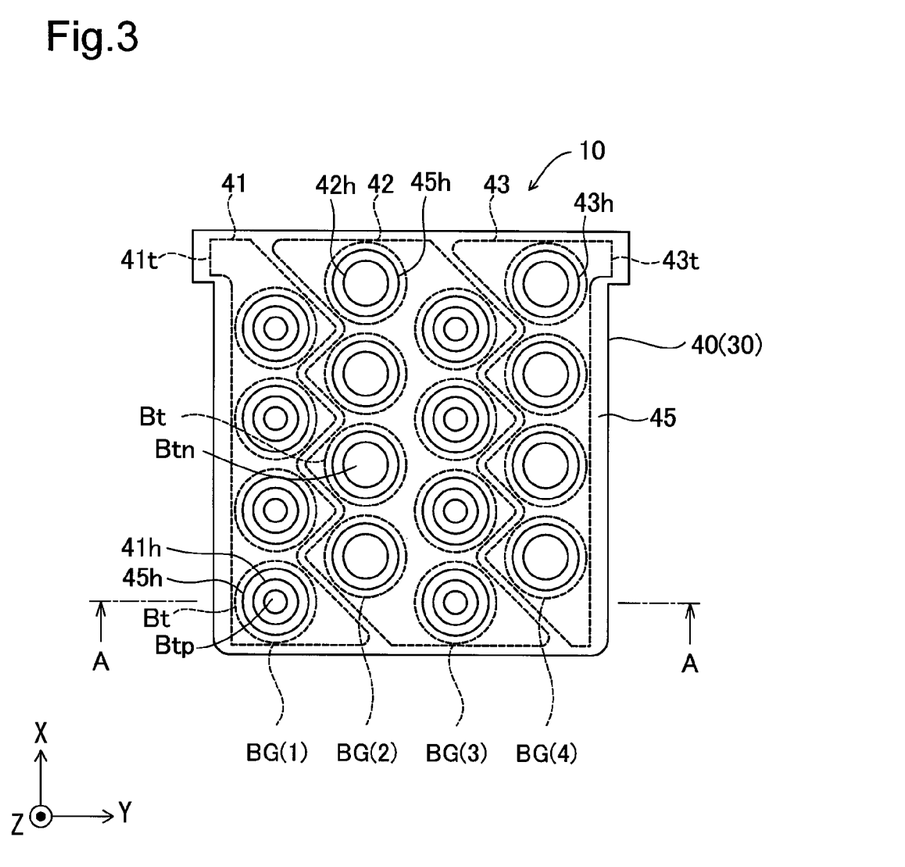
FIG. 3 is a plan view illustrating the main part of the battery pack.

FIG. 1 is a perspective view illustrating the appearance of a battery pack 10 according to a first embodiment of the invention. FIG. 2 is a perspective view illustrating a main part of the battery pack 10. FIG. 3 is a plan view illustrating the main part of the battery pack 10.

As shown in FIGS. 2 and 3, the battery pack 10 is comprised of a plurality of batteries Bt which are arrayed to have the axial directions of the respective batteries Bt parallel to one another and are linked with one another. The term "parallel" herein is not limited to strictly parallel configuration but includes approximately parallel configuration as long as the functions and the advantageous effects of the invention are not damaged. The battery Bt is a cylindrical (practically columnar) general-purpose battery and may be, for example, a lithium battery used as a power source for automobile. XYZ axes orthogonal to one another are shown in FIGS. 1 to 3. X direction is also called an array direction of the batteries Bt. Y direction is a direction orthogonal to the array direction. Z direction is a direction parallel to the side surface of the batteries Bt and is substantially equal to the axial direction of the batteries Bt. According to this embodiment, the battery pack 10 is mounted on an apparatus, for example, an automobile, such that the axial direction of the respective batteries Bt is set to the vertical direction as shown in FIG. 2. In the description below, an upper side along the Z direction is simply called "upper side", and an opposite side along the Z direction is simply called "lower side". The upper side and the lower side respectively correspond to the "first side" and the "second side" in the aspects of the invention described in Summary.

The battery pack 10 is comprised of a plurality of the batteries Bt, and each group of multiple batteries arrayed in the X direction is called a battery array. According to this embodiment, each battery array has four batteries Bt, and four battery arrays are arranged along the Y direction. These battery arrays are expressed as battery arrays BG(1), BG(2), BG(3) and BG(4) sequentially from left as shown in FIG. 3. The number of battery arrays is not limited to four, and the number of batteries Bt constituting each battery array is also not limited to four. The number of battery arrays and the number of batteries may be identical with each other (for example, 3×3 or 5×5) or may be different from each other (for example, 4×7 or 5×9).

The battery pack 10 includes a metal plate 30 provided to bind the plurality of batteries Bt on one end side (upper side) in the axial direction of the batteries Bt, a first bus bar holing member 40 placed on the upper side of the metal plate 30 and a second bus bar holding member 50 placed on the other end side (lower side) of the respective batteries Bt. A sponge sheet 60 is provided between the respective batteries Bt and the second bus bar holding member 50. The metal plate 30 corresponds to the "battery holding member" in the aspects of the invention; the second bus bar holding member 50 corresponds to the "bus bar holding member" in the aspects of the invention; and the sponge sheet 60 corresponds to the "sealing sheet member" in the aspects of the invention.

As shown in FIG. 1, the battery pack 10 has approximately rectangular parallelepiped appearance. The first bus bar holding member 40 is exposed on the upper surface (top surface) of the battery pack 10, while the side surface and the lower surface (bottom surface) of the battery pack 10 is covered with a container 70. In other words, the first bus bar holding member 40 and the container 70 form the casing of the battery pack 10. The metal plate 30 and the plurality of batteries Bt described above are contained in the casing. The container 70 is partly omitted from the illustration of FIG. 2 and is entirely omitted from the illustration of FIG. 3.

A-2. Structures of Respective Components of Battery Pack

Figure 4:
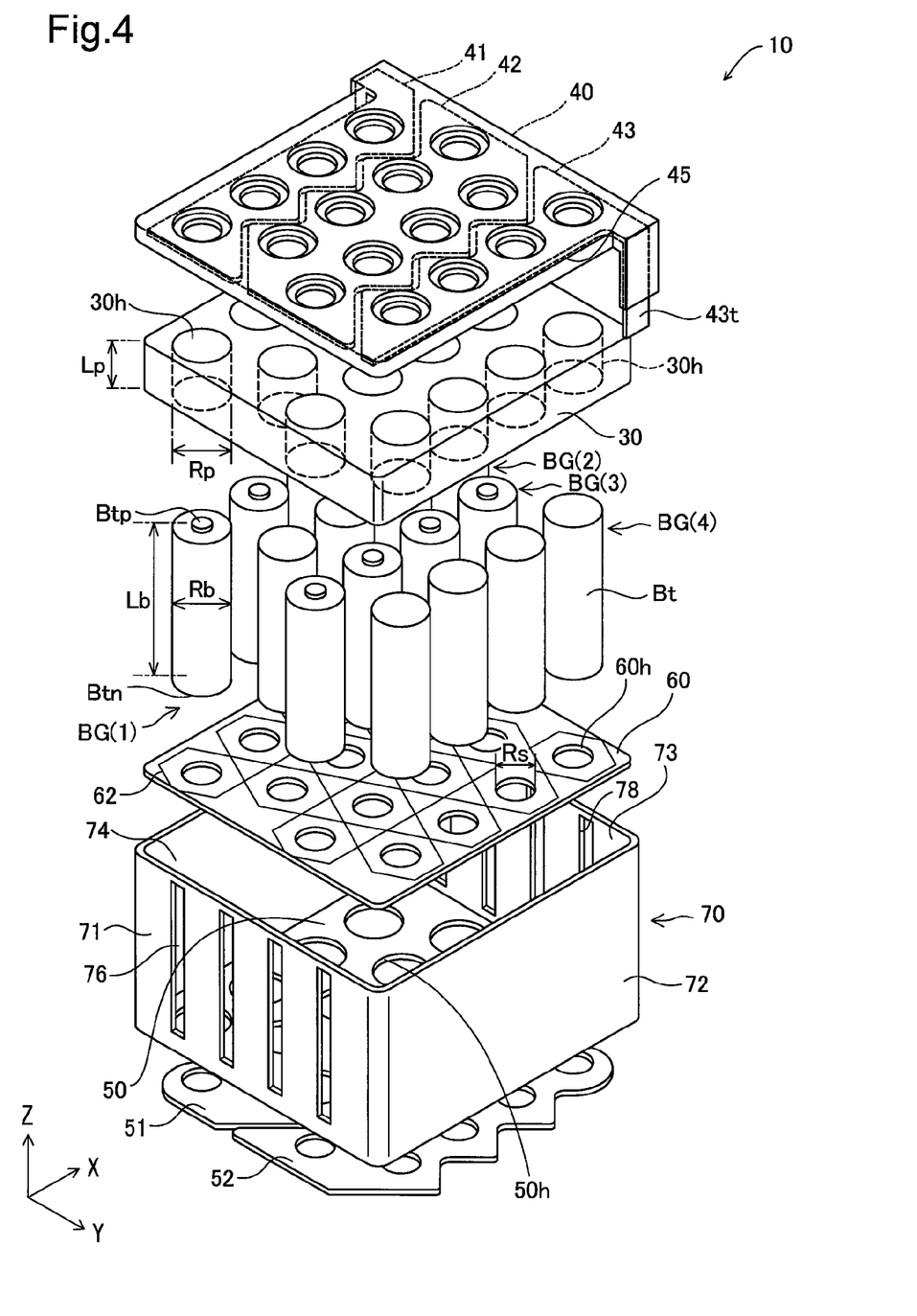
FIG. 4 is an exploded perspective view illustrating the battery pack.

FIG. 4 is an exploded perspective view illustrating the battery pack 10. In FIG. 4, the respective components of the battery pack 10 are shown away from the batteries Bt in the Z direction. Each of the batteries Bt has a positive terminal Btp formed on its one end in the axial direction and a negative terminal Btn formed on its other end. As illustrated, the respective batteries Bt are arranged such that adjacent battery arrays BG are oriented reversely in the vertical direction. More specifically, the battery arrays BG(1) and BG(3) are arranged to make the positive terminals Btp face up, whereas the battery arrays BG(2) and BG(4) are arranged to make the positive terminals Btp face down.

The metal plate 30 is a plate-like body having an approximately rectangular planar shape and a fixed thickness Lp and is made of aluminum. The material of the metal plate 30 is, however, not limited to aluminum but may be another metal such as plated steel. The thickness Lp is smaller than length Lb of the battery Bt in the axial direction. The metal plate 30 has sixteen through holes 30$h$ formed therein. The sixteen through holes 30$h$ are provided as circular holes having an identical inner diameter Rp and are arranged as four in the X direction and four in the Y direction like the arrangement of the batteries Bt. In other words, the sixteen through holes 30$h$ are formed at the positions corresponding to the positions of the sixteen batteries Bt described above.

Figure 5:
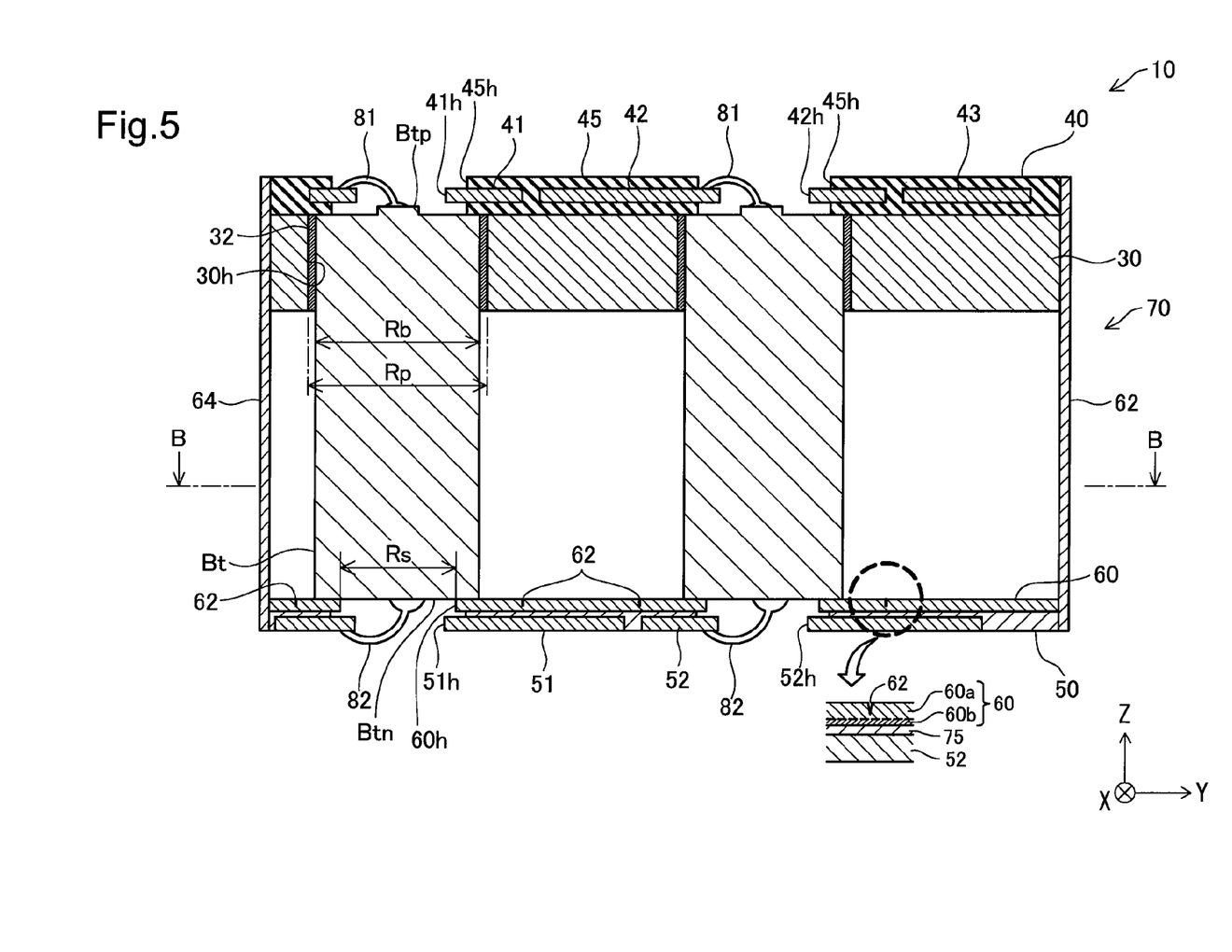
FIG. 5 is a cross sectional view taken in the direction of arrow A-A in FIG. 3.

FIG. 5 is a cross sectional view taken in the direction of arrow A-A in FIG. 3. As shown in FIGS. 4 and 5, the inner diameter Rp of the through hole 30$h$ is slightly larger than outer diameter Rb of the battery Bt, and the difference by subtracting the outer diameter Rb from the inner diameter Rp is 0.4 mm in this embodiment. This configuration enables the battery Bt to be inserted in its axial direction into the through hole 30$h$ and allows an adhesive 32 (FIG. 5) to be injected into a clearance (=0.2 mm) between the battery Bt and the inner circumferential surface of the through hole 30$h$ after insertion of the battery Bt into the through hole 30$h$. The respective batteries Bt are inserted into the respective through holes 30$h$ and the adhesive 32 is injected to bond between the side surface of each battery Bt and the through hole 30h, so that the respective batteries Bt are fixed in the respective through holes 30h. The fixation position of each battery Bt in the through hole 30h is the upper side in the axial direction of the battery Bt. Accordingly the metal plate 30 binds and holds the plurality of batteries Bt on the upper side in the axial direction of the batteries Bt. The inner diameter Rp of the through hole 30h is not limited to be greater by 0.4 mm than the outer diameter Rb of the battery Bt described above but may be set to be greater by any suitable value, for example, 0.1 to 1.0 mm.

The first bus bar holding member 40 is placed on the upper side of the metal plate 30. The first bus bar holding member 40 is configured to hold three bus bars made of metal thin plates, i.e., a positive electrode bus bar 41, a linkage bus bar 42 and a negative electrode bus bar 43. More specifically, the respective bus bars 41 to 43 are embedded in a resin support member 45 made of a resin material by insert molding, so as to be held in the first bus bar holding member 40. The respective bus bars 41 to 43 are formed by pressing metal thin plates and have thickness of 0.4 to 1.2 mm. The three bus bars 41 to 43 correspond to the "first bus bar" in the aspects of the invention.

The positive electrode bus bar 41 is a plate member configured to connect the positive terminals Btp of the four batteries Bt in the battery array BG(1) in parallel and has an external terminal 41t. The linkage bus bar 42 is a plate member configured to connect the negative terminals Btn of the four batteries Bt in the battery array BG(2) in parallel, to connect the positive terminals Btp of the four batteries Bt in the battery array BG(3) in parallel and to interconnect the positive terminals Btp with the negative terminals Btn. The negative electrode bus bar 43 is a plate member configured to connect the negative terminals Btn of the four batteries Bt in the battery array BG(4) in parallel and has an external terminal 43t. The external terminal 41t on the positive electrode side and the external terminal 43t on the negative electrode side are formed by bending and folding the corresponding ends in the perpendicular direction, i.e., downward in the Z direction, and are connected with outside terminals (not shown) to serve as terminals through which electric output is taken out from the battery pack 10.

As shown in FIGS. 3 and 5, the respective bus bars 41 to 43 have terminal openings 41h, 42h and 43h formed at the positions corresponding to the respective batteries Bt. The positive terminal Btp or the negative terminal Btn of the battery Bt is exposed on each of the terminal openings 41h, 42h and 43h. Each of the bus bars 41 to 43 is connected with the exposed positive terminals Btp or the exposed negative terminals Btn via electric connection of wiring 81 (FIG. 5) by wire bonding.

The resin support member 45 has the positive electrode bus bar 41, the linkage bus bar 42 and the negative electrode bus bar 43 embedded in the resin material as described above and is arranged to ensure the electrical insulation between the plurality of bus bars 41 to 43 and hold the respective bus bars 41 to 43 in the planar state. The resin material of the resin support member 45 may be a polyester resin or a polyester elastomer, for example, polybutylene terephthalate (PBT) or PBT-based polyester elastomer. The resin support member 45 has a plurality of resin openings 45h formed to be concentrically with the terminal openings 41h, 42h and 43h of the bus bars 41, 42 and 43 and to have larger diameter than the diameters of the terminal openings 41h, 42h and 43h. Accordingly, the terminal openings 41h, 42h and 43h of the bus bars 41, 42 and 43 are not blocked by the resin material.

As shown in FIG. 4, the sponge sheet 60 is provided on the lower side of the batteries Bt. The sponge sheet 60 includes a sheet like sponge 60a as a base material and a tape adhesive layer 60b applied on one surface of the sponge 60a as shown in FIG. 5. The sponge 60a may be made of, for example, soft polyurethane foam. The sponge 60a may alternatively be made of another material such as polyethylene or rubber sponge, instead of soft polyurethane foam. These are extruded sheets, but the sponge 60a may be formed in a sheet by injection molding. The tape adhesive layer 60b is made of a double-sided adhesive tape. As shown in FIG. 5, the sponge sheet 60 is arranged, such that the tape adhesive layer 60b-side faces down. The sponge sheet 60 is fixed by the tape adhesive layer 60b to the upper surface in the Z direction of the second bus bar holding member 50, which forms the bottom of the container 70 to contain the sixteen batteries Bt therein.

Figure 6:
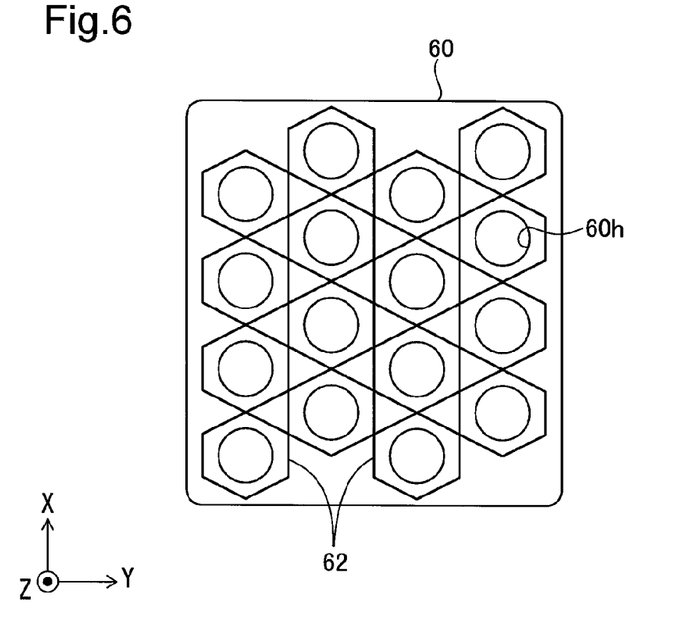
FIG. 6 is a plan view illustrating a sponge sheet.

FIG. 6 is a plan view illustrating the sponge sheet 60. As shown in FIG. 6, the sponge sheet 60 has sixteen holes 60h. The sixteen holes 60h are circular through holes having an identical inner diameter Rs and are arranged as four in the X direction and four in the Y direction like the arrangement of the batteries Bt. In other words, the sixteen holes 60h are formed at the positions corresponding to the positions of the sixteen batteries Bt described above.

As shown in FIG. 5, the inner diameter Rs of the holes 60h is smaller than the outer diameter Rb of the batteries Bt, and the difference by subtracting the inner diameter Rs of the holes 60h from the outer diameter Rb of the batteries Bt is, for example, about 2 to 4 mm according to this embodiment. In assembly of the battery pack 10, the peripheries of the respective holes 60h come into contact with the peripheries of the respective end faces on the lower side in the Z direction of the batteries Bt, and the lower side of the respective batteries Bt is sealed by the sponge sheet 60. In this state, the positive terminal Btp or the negative terminal Btn of each battery Bt is exposed on the lower side in the hole 60h. The hole 60h corresponds to the "terminal exposing hole" in the aspects of the invention.

As shown in FIGS. 5 and 6, cuts 62 are formed along the peripheries of the respective holes 60h on the upper surface of the sponge sheet 60. The cuts 62 are formed in the thickness direction of the sponge sheet 60 to the positions of about one half of the entire thickness from the upper surface. The cuts 62 are formed in the shape of hexagons surrounding the respective holes 60h in the planar view. The cuts 62 may be formed by, for example, pressing. The cuts 62 correspond to the "deformation dividing part" in the aspect of the invention and serve to improve the sealing property of the sponge sheet 60. The functions and the advantageous effects of the cuts 62 will be described later in detail.

As shown in FIG. 4, the container 70 is configured to have four side wall sections 71 to 74 and the second bus bar holding member 50 forming its bottom section (wall surface on the lower side in the X direction). The length and the width of the second bus bar holding member 50 are substantially equal to the length and the width of the sponge sheet 60 described above. The second bus bar holding member 50 has openings 50h of a larger diameter than the diameter of the holes 60h at the positions corresponding to the holes 60h of the sponge sheet 60. The container 70 is made of resin and has electrical insulating properties. The resin material of the container 70 may be a polyester resin or a polyester elastomer, for example, polybutylene terephthalate (PBT) or PBT-based polyester elastomer.

The lower surface of the second bus bar holding member 50 constituting the container 70 has concaves formed to receive two bus bars, i.e., a first linkage bus bar 51 and a second linkage bus bar 52. The first and second linkage bus bars 51 and 52 are fastened to the respective concaves by engagement claws (not shown). The relationship of assembly of the sponge sheet 60, the second bus bar holding member 50 and the first and the second linkage bus bars 51 and 52 are also shown in FIGS. 2 and 5. The side wall sections 71 to 74 of the container 70 are omitted from the illustration of FIG. 2. The first and second linkage bus bars 51 and 52 correspond to the "second bus bar" in the aspects of the invention.

As shown in FIGS. 2 and 4, the first linkage bus bar 51 is a metal plate member configured to connect the negative terminals Btn of the four batteries Bt in the battery array BG(1) in parallel, to connect the positive terminals Btp of the four batteries Bt in the battery array BG(2) in parallel and to interconnect the negative terminals Btn with the positive terminals Btp. The second linkage bus bar 52 is a metal plate member configured to connect the negative terminals Btn of the four batteries Bt in the battery array BG(3) in parallel, to connect the positive terminals BTp of the four batteries Bt in the battery array BG(4) in parallel and to interconnect the negative terminals Btn with the positive terminals Btp.

More specifically, as shown in FIG. 5, terminal openings 51$h$ and 52$h$ are formed at the positions corresponding to the respective batteries Bt in the first and the second linkage bus bars 51 and 52. The terminal openings 51$h$ and 52$h$ have inner diameters smaller than the inner diameter of the holes 60$h$ in the sponge sheet 60 described above. The sponge sheet 60 and the second bus bar holding member 50 located below the bottoms of the batteries Bt have the holes 60$h$ and the openings 50$h$ at the positions corresponding to the respective batteries Bt. Accordingly, the positive terminal Btp or the negative terminal Btn of the battery Bt is exposed in each of the terminal openings 51$h$ and 52$h$ of the first and second linkage bus bars 51 and 52. Each of the linkage bus bars 51 and 52 is connected with the exposed positive terminal Btp or the exposed negative terminal Btn via electric connection of wiring 82 by wire bonding.

As described above, the battery pack 10 is a battery assembly of the sixteen (four by four) batteries Bt and is configured such that the four batteries Bt included in each battery array BG are connected in parallel and the respective battery arrays BG are connected in series by the three bus bars 41 to 43 held by the first bus bar holding member 40 and the two bus bars 51 and 52 held by the second bus bar holding member 50.

In this battery pack 10, as shown in FIG. 4, the front side wall section 71 and the rear side wall section 73 in the X direction of the container 70 respectively have openings 76 and 77 formed to make a flow of cooling air in the casing. The openings 76 and 77 are provided as vertically long slits having their longitudinal axes along the Z direction and respectively include a plurality of (four in the embodiment) openings.

Figure 7:
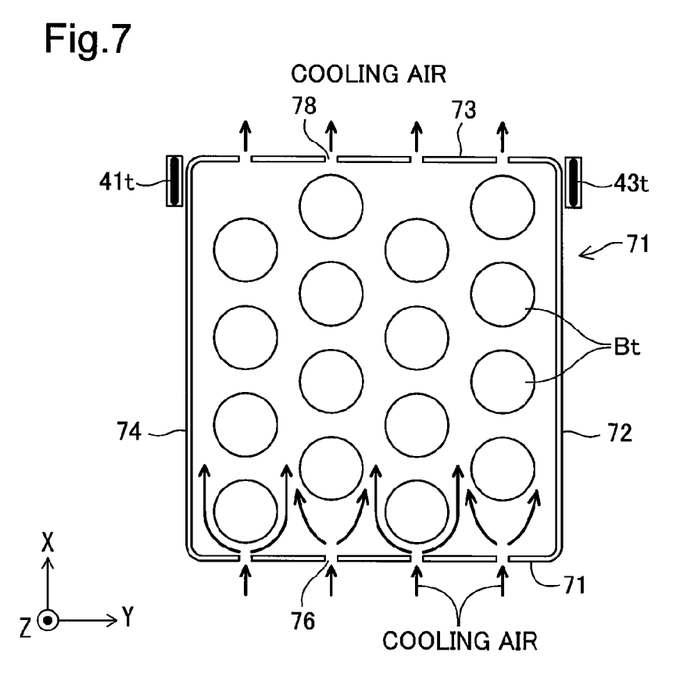
FIG. 7 is a cross sectional view taken in the direction of arrow B-B in FIG. 5.

FIG. 7 is a cross sectional view taken in the direction of arrow B-B in FIG. 5. As shown by the arrows in the illustration, the cooling air comes through the openings 76 formed in the front side wall section 71 into the container 70, passes between the respective batteries Bt and goes out through the openings 78 formed in the rear side wall section 73. The cooling air accordingly flows in the radial direction of the respective batteries Bt, so as to cool down the respective batteries Bt.

A-3. Functions and Advantageous Effects of Embodiment

In the battery pack 10 of the first embodiment having the configuration described above, the upper side in the Z direction or the axial direction of the batteries Bt is sealed with the metal plate 30 and the adhesive 32 applied inside of the through holes 30$h$ as described above, so that the cooling air is not leaked from the upper side of the casing. The lower side in the Z direction or the axial direction of the batteries Bt is sealed with the sponge sheet 60 as described above, so that the cooling air is not leaked from the lower side of the casing.

Figure 8:
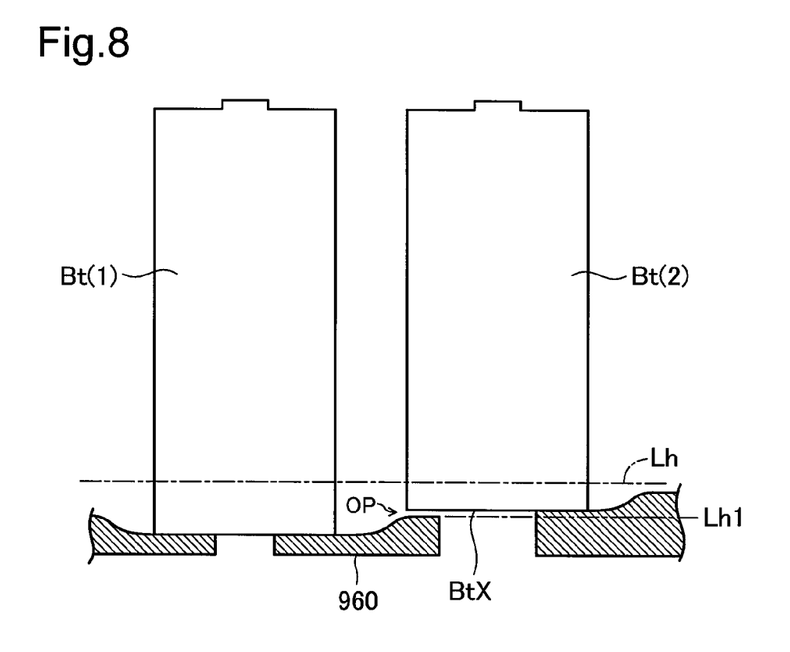
FIG. 8 is a diagram illustrating the periphery of a sponge sheet in a battery pack of a comparative example.

The following describes the functions and the advantageous effects of the battery pack 10 of the embodiment in comparison with a comparative example. FIG. 8 is a diagram illustrating the periphery of a sponge sheet 980 in a battery pack of a comparative example. Unlike the sponge sheet 60 of the first embodiment, the sponge sheet 960 of the comparative example does not have the cuts 62 formed along the peripheries of the holes 60$h$. As illustrated, there is a variation in length in the axial direction of batteries Bt. When a left-side battery Bt(1) is longer than a right-side battery Bt(2) as illustrated, the sponge sheet 960 is compressed more significantly in an area corresponding to the left-side battery Bt(1) than an area corresponding to the right-side battery Bt(2). A dashed dotted line Lh in the illustration indicates the position of the upper surface of the sponge sheet 960 prior to compression. When the area corresponding to the left-side battery Bt(1) is significantly compressed, the area in the upper surface of the sponge sheet 960 corresponding to the right-side battery Bt(2) may be pulled down by the effect of such significant compression to the position of a dashed dotted line Lh1 in the illustration. The position of this line Lh1 is lower than a lower end face BtX of the right-side battery Bt(2). A clearance OP is accordingly formed between the right-side battery Bt(2) and the sponge sheet 960 and leads to poor sealing property. In the battery pack of the comparative example, when there is a variation in length in the axial direction of the respective batteries, a battery may have poor sealing by the effect of compressive deformation of the sponge sheet at the position of an adjacent battery.

Figure 9:
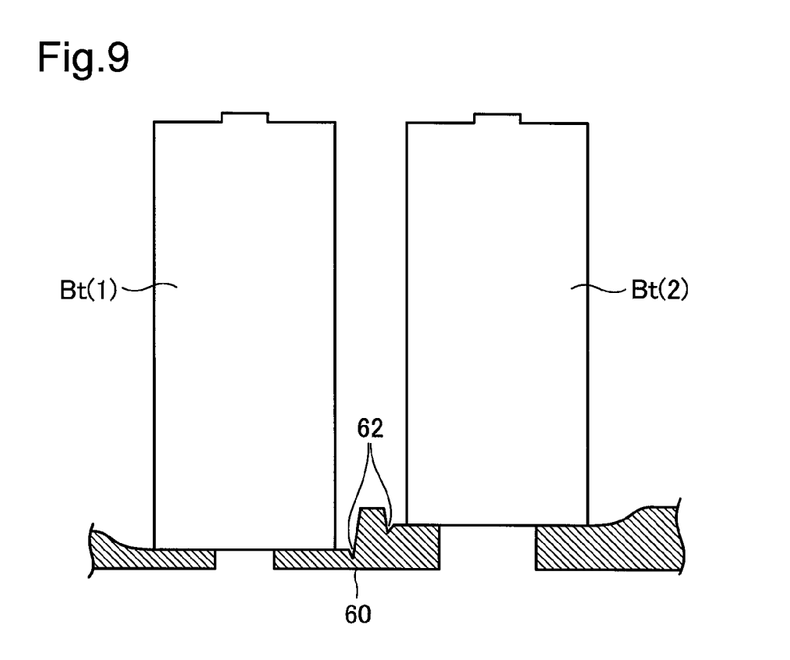
FIG. 9 is a diagram illustrating the functions of the sponge sheet according to the first embodiment.

In the battery pack 10 of the first embodiment, on the other hand, the sponge sheet 60 has the cuts 62 and can thus reduce the effect of compressive deformation described above even when the respective batteries Bt have a variation in length in the axial direction. When there is a difference in degree of compressive deformation between the areas of the sponge sheet 60 corresponding to adjacent batteries Bt, a part of the sponge sheet 60 is pulled at the cuts 62 toward the battery of more significant compressive deformation and the cuts 62 are deformed to be opened as shown in FIG. 9. Such deformation of the cuts 62 restricts the effect of compressive deformation caused in the area of the sponge sheet 60 corresponding to the adjacent battery Bt to inside of the cuts 62. Accordingly, the battery pack 10 of the first embodiment does not have poor sealing like the comparative example and effectively prevents the cooling air from being leaked from the lower side of the casing. Even when there is no substantial variation in length in the axial direction of the respective batteries Bt, a difference in the binding position between the batteries Bt by the metal plate 30 also leads to a variation in height of the lower side between the batteries Bt. In this case, the cuts 62 serve to suppress the area of the sponge sheet 60 corresponding to an adjacent battery Bt from being affected by a difference in degree of compressive deformation of the sponge sheet 60 and thus similarly prevents leakage of the cooling air. As a result, the battery pack 10 of the first embodiment has the advantageous effect of the enhanced cooling performance. In this embodiment, the deformation dividing part is provided by forming the cuts 62 in the sponge sheet 60. Another advantageous effect is accordingly formation of the deformation dividing part at a low cost, for example, by pressing as described above.

B. Second Embodiment

Figure 10:
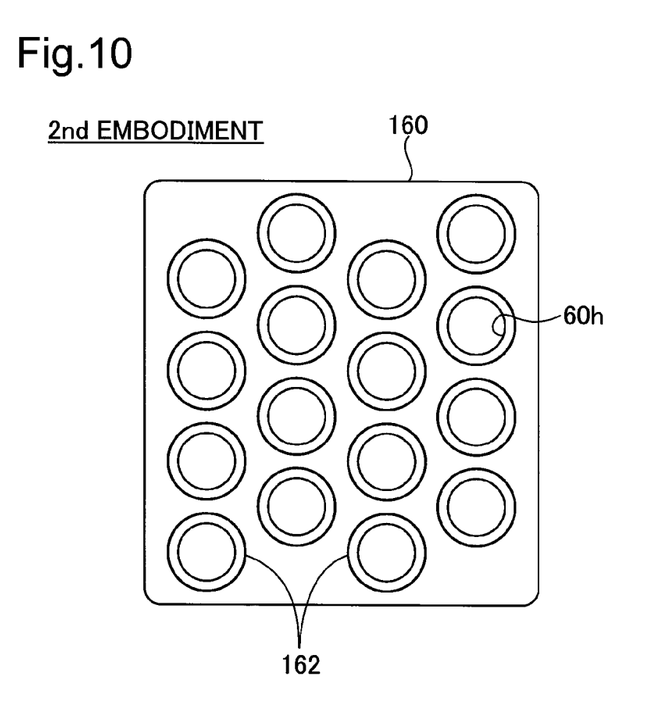
FIG. 10 is a plan view illustrating a sponge sheet included in a battery pack according to a second embodiment of the invention.

FIG. 10 is a plan view illustrating a sponge sheet 160 included in a battery pack according to a second embodiment of the invention. This sponge sheet 160 differs from the sponge sheet 60 of the first embodiment by the shape of cuts 162, but otherwise has similar structure to that of the sponge sheet 60 of the first embodiment. The configuration of the battery pack of the second embodiment other than the sponge sheet 160 is also similar to the configuration of the battery pack 10 of the first embodiment. The cuts 162 of this embodiment are formed in the thickness direction like the first embodiment but have a different shape in the planar view from that of the first embodiment. As illustrated, the cuts 162 are formed in the shape of circles surrounding respective holes 60h in the planar view.

Like the first embodiment, in the configuration of the second embodiment, the cuts 162 are opened to prevent the surrounding area beyond the cuts 162 from being affected by the compressive deformation caused by a variation in length in the axial direction of the respective batteries. Accordingly, like the battery pack 10 of the first embodiment, the battery pack of the second embodiment effectively prevents leakage of the cooing air from the lower side of the casing and has the advantageous effect of enhanced cooling performance.

C. Third Embodiment

Figure 11:
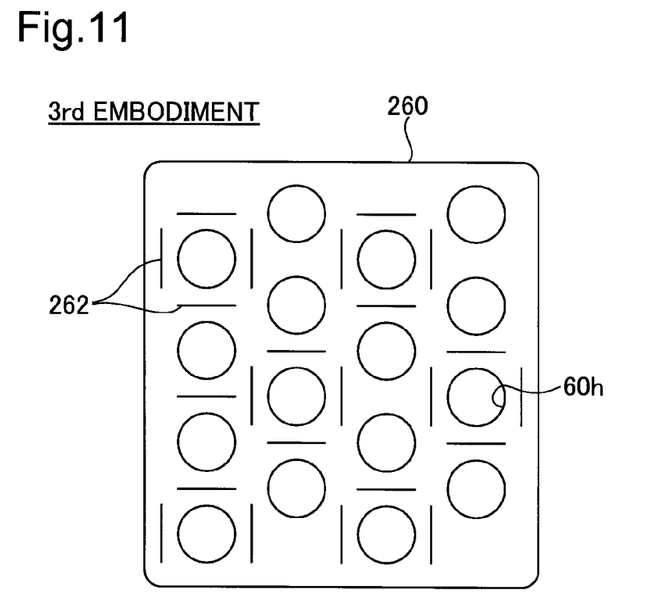
FIG. 11 is a plan view illustrating a sponge sheet included in a battery pack according to a third embodiment of the invention.

FIG. 11 is a plan view illustrating a sponge sheet 260 included in a battery pack according to a third embodiment of the invention. This sponge sheet 260 differs from the sponge sheet 60 of the first embodiment by the shape of cuts 262, but otherwise has similar structure to that of the sponge sheet 60 of the first embodiment. The configuration of the battery pack of the third embodiment other than the sponge sheet 260 is also similar to the configuration of the battery pack 10 of the first embodiment. The cuts 262 of this embodiment are formed in the thickness direction like the first embodiment but have a different shape in the planar view from that of the first embodiment. As illustrated, in the third embodiment, the cuts 262 of four straight lines are arranged to surround each hole 60h with respect to part of a plurality of holes 60h included in the sponge sheet 260. More specifically, in the first embodiments, the cuts 62 are formed to surround all the plurality of holes 60h included in the sponge sheet 60. In the third embodiment, on the other hand, the cuts 262 are formed to surround only part of the plurality of holes 60h. In addition, the cuts 262 of four straight lines arranged to surround each hole 60h are separate from each other, while the cuts 62 arranged to surround each hole 60h form an enclosed region in the first embodiment.

In the configuration of the third embodiment, the cuts 262 are opened to prevent the surrounding area beyond the cuts 262 from being affected by the compressive deformation caused by a variation in length in the axial direction of the respective batteries. Accordingly, like the battery pack 10 of the first embodiment, the battery pack of the third embodiment effectively prevents leakage of the cooing air from the lower side of the casing and has the advantageous effect of enhanced cooling performance.

According to one modification of this third embodiment, the cuts 262 of four straight lines may be formed to surround all the plurality of holes 60h, instead of part of the plurality of holes 60h in the third embodiment. The cuts 262 of four straight lines are formed to surround each hole 60h in the third embodiment. All the four straight lines may, however, be not essential, but the cuts formed with respect to each hole 60h may be only one, two or three straight lines. Additionally, the number of straight line cuts arranged to surround each hole 60h is not limited to four but may be three or may be five or more. In other words, the configuration and arrangement of cuts may be designed freely, as long as the cuts are formed around at least some of the holes 60h. The first and the second embodiments described above may also be modified, such that the cuts are formed around only part of the plurality of holes 60h included in the sponge sheet 60 or 160.

D. Fourth Embodiment

Figure 12:
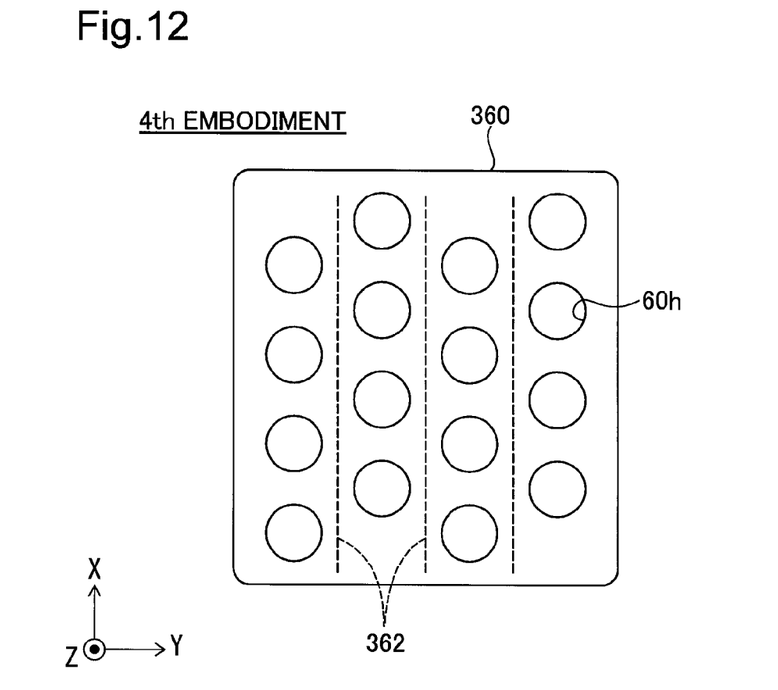
FIG. 12 is a plan view illustrating a sponge sheet included in a battery pack according to a fourth embodiment of the invention.

FIG. 12 is a plan view illustrating a sponge sheet 360 included in a battery pack according to a fourth embodiment of the invention. The battery pack of the fourth embodiment differs from the battery pack 10 of the first embodiment by the structure of a sponge sheet 360. The sponge sheet 360 of the fourth embodiment differs from the sponge sheet 60 of the first embodiment by that the sponge sheet 360 of the fourth embodiment has perforations 362 while the sponge sheet 60 of the first embodiment has the cuts 62. Otherwise the sponge sheet 360 of the fourth embodiment has the similar structure to that of the sponge sheet 60 of the first embodiment. As illustrated, three perforations 362 are formed linearly between arrays of holes 60h aligned in the X direction.

Figure 13:
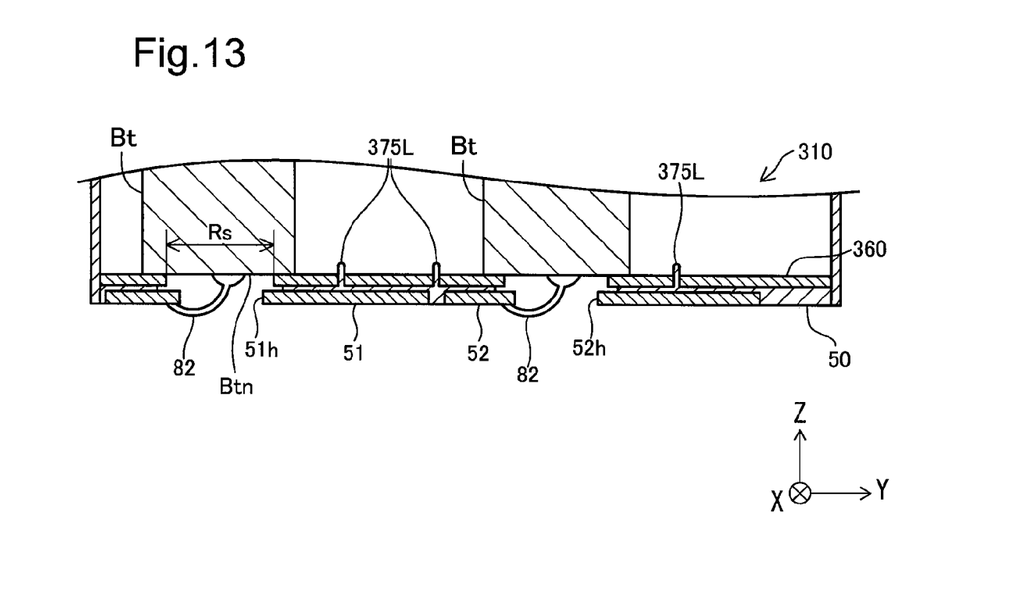
FIG. 13 is a cross sectional view illustrating a lower side of the battery pack of the fourth embodiment.

FIG. 13 is a cross sectional view illustrating a lower side of a battery pack 310 of the fourth embodiment. The battery pack 310 of the fourth embodiment differs from the battery pack 10 of the first embodiment by that ribs 375L are formed as projections on the upper surface of the second bus bar holding member 50. Accordingly, the battery pack 310 of the fourth embodiment differs from the battery pack 10 of the first embodiment by the structure of the sponge sheet 360 and addition of the ribs 375L, but otherwise has the similar configuration to that of the battery pack 10 of the first embodiment. The like components in FIG. 13 are expressed by the like numerals to those of FIG. 5 are not specifically described here.

Figure 14:
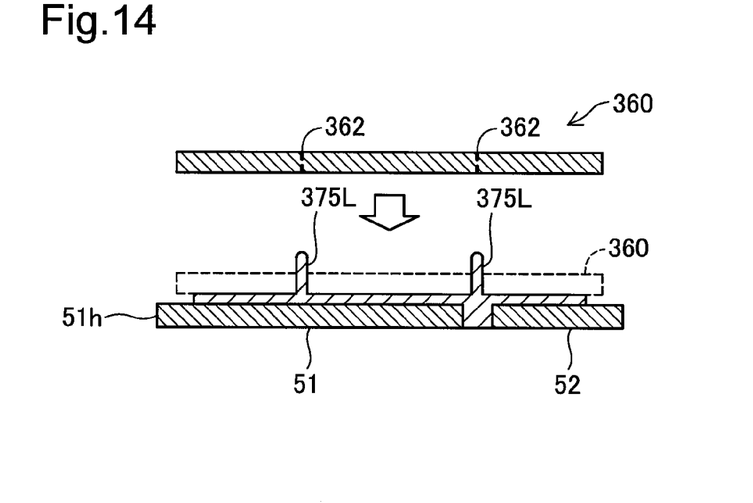
FIG. 14 is a diagram illustrating assembly between a second bus bar holding member and the sponge sheet according to the fourth embodiment.

The ribs 375L provided on the upper surface of the second bus bar holding member 50 serve to ensure a distance between adjacent batteries Bt in a planar direction perpendicular to the axial direction of the batteries Bt and are formed at the positions corresponding to at least part of the perforations 362 in the planar view in the Z direction. According to this embodiment, as shown in FIG. 14, in the course of assembling the sponge sheet 360 to the second bus bar holding member 50, the ribs 375L break the perforations 362 to be protruded on the sponge sheet 360. The perforations 362 correspond to the "deformation dividing part" in the aspects of the invention.

In the battery pack 310 of the fourth embodiment having the configuration described above, even when there is a variation in length in the axial direction of the respective batteries Bt, part of the perforations 362 are broken and opened by the ribs 375L, so as to prevent the surrounding area beyond the cuts 362 from being affected by compressive deformation. Accordingly, like the battery pack 10 of the first embodiment, the battery pack 310 of the fourth embodiment effectively prevents leakage of the cooing air from the lower side of the casing and has the advantageous effect of enhanced cooling performance. In the battery pack 310 of the fourth embodiment, the ribs 375L formed on the second bus bar holding member 50 separate the adjacent arrays of the terminal exposing holes 60h from each other in the sponge sheet 360. This configuration ensures another advantageous effect of preventing a short circuit between adjacent battery arrays BG even when water caused by dew condensation on the side face of the battery Bt is accumulated on the sponge sheet 360.

The battery pack 310 of the fourth embodiment has the ribs 375L provided as the projections on the second bus bar holding member 50 to break the perforations 362 formed in the sponge sheet 360. Such projections may be provided on the second bus bar holding member 50 in the battery pack 10 of the first embodiment or the second embodiment. Such projections also may be provided on the second bus bar holding member in the battery pack of the third embodiment.

E. Modification

The invention is not limited to the embodiments, the examples or the modifications described above, but a multiplicity of variations and modifications may be made to the embodiments without departing from the scope of the invention. Some examples of possible modification are given below.

Modification 1:

In the respective embodiments described above, the batteries Bt are cylindrical batteries. This is, however, not restrictive, and alternatively rectangular batteries or batteries in any other suitable shape may be employed as the batteries Bt.

Modification 2:

In the first embodiment described above, the cuts 62 provided as the deformation dividing part in the sponge sheet 60 are formed in the shape of hexagons in the planar view. The cuts 62 may, however, be formed in the shape of other polygons such as triangles, rectangles or pentagons. In the first to the third embodiments, the deformation dividing part provided in the sponge sheet is formed as the cuts. In the fourth embodiment, the deformation dividing part is formed as the perforations which are broken by the ribs. The deformation dividing part may, however, be not limited to any of such shapes or configurations. The deformation dividing part may be provided in any other shape or in any other configuration which enables the deforming compressive force applied to the sponge sheet to be divided when there is a variation in length in the axial direction of the respective batteries. For example, grooves may be formed at the corresponding positions where the cuts or the perforations are formed in the respective embodiments.

Modification 3:

In the respective embodiments described above, the first bus bar holding member 40 is placed on the upper side in the axial direction of the batteries Bt, and the second bus bar holding member 50 is placed on the lower side in the axial direction of the batteries Bt. This configuration may be turned upside down. More specifically, the first bus bar holding member 40 may be placed on the lower side in the axial direction of the batteries Bt, and the second bus bar holding member 50 may be placed on the upper side in the axial direction of the batteries Bt.

Additionally, the technical features of the embodiments and the modifications corresponding to the technical features of the respective aspects described in Summary may be replaced or combined appropriately, in order to solve part or all of the problems described above or in order to achieve part or all of the advantageous effects described above. Any of the technical features may be omitted appropriately unless the technical feature is described as essential herein.

What is claimed is:

1. A battery pack comprising:
a casing that defines a first side and a second side relative to an axial direction of a plurality of batteries and that is configured to contain the plurality of batteries;
a battery holding member provided to have a plurality of battery holding holes and configured to bind the respective batteries in such a state that the respective batteries are parallel to one another in the axial direction of the batteries, by insertion of ends on the first side into the respective battery holding holes;
a first bus bar arranged to electrically connect with battery terminals on the first side;
a second bus bar arranged to electrically connect with battery terminals on the second side opposite to the first side;
a bus bar holding member that is configured to hold the second bus bar and constitute a wall surface on the second side, and that has a projection protruded from a surface on the first side toward a space between the respective batteries; and
a sealing sheet member placed between end faces on the second side and the bus bar holding member and configured to have a plurality of terminal exposing holes formed corresponding to the respective batteries and cause peripheries of the respective terminal exposing holes to come into contact with the end faces of the respective batteries, so as to prevent leakage of a gas from inside of the casing toward the second bus bar, wherein
the sealing sheet member has a deformation dividing part provided around at least part of the plurality of terminal exposing holes, the deformation dividing part is a breaking part formed as a perforation that remains in a perforated state prior to assembly of the sealing sheet member to the bus bar holding member and is broken during assembly of the sealing sheet member to the bus bar holding member.

2. The battery pack according to claim 1,
wherein the deformation dividing part is a cut formed on a surface of the sealing sheet member that is located on the first side.

3. The battery pack according to claim 2,
wherein the cut is in a polygonal shape.

4. The battery pack according to claim 2,
wherein the cut is in a circular shape.

5. The battery pack according to claim 1,
wherein the casing has openings configured to flow in and flow out a gas for cooling in a radial direction of the batteries.

* * * * *